UNITED STATES PATENT OFFICE.

HELEN C. WILBER, OF FAYETTE, MICHIGAN.

SALVE.

SPECIFICATION forming part of Letters Patent No. 302,875, dated July 29, 1884.

Application filed November 15, 1883. (No specimens.)

*To all whom it may concern:*

Be it known that I, HELEN C. WILBER, a citizen of the United States, and a resident of Fayette, in the county of Delta and State of Michigan, have invented certain new and useful Improvements in Medical Compounds; and I do hereby declare that the following is a full, clear, and exact description of the invention, which will enable others skilled in the art to which it appertains to make and use the same.

My discovery relates to external remedies—such as salves or ointments; and it consists in a salve made of beeswax, balsam-fir, mutton-tallow, castile-soap, and pine-tar, mixed and prepared in the following manner, viz: Equal parts of beeswax, balsam-fir, (*Terebinthina Canadensis,*) mutton-tallow, and castile-soap are melted together, whereupon pine-tar is added in an amount equal to one-half the amount of the other ingredients together.

For salt-rheum, use the salve every night and morning. For removing warts it is to be applied every night; and for burns, wounds, or old sores the salve is to be applied when the wound or sore is dressed.

I am aware that the several ingredients of this salve have been used separately and together in salves and ointments; but I am not aware that they have been used in the exact proportions in which I use them, and which attain superior results; wherefore I do not wish to claim a salve composed of these ingredients, broadly.

I am also aware that in Patent No. 80,353, granted on the 28th of July, 1868, to Richard Jonas, nearly all the ingredients used in my compound are used; and I only wish to claim the compound consisting of all the ingredients in their exact proportions, whereby I obtain superior results.

What I claim is—

The herein-described medical compound for external use, composed of equal parts of beeswax, balsam-fir, (*Terebinthina Canadensis,*) mutton-tallow, and castile-soap, melted together and mixed with pine-tar to the amount of one-half of the entire amount of the other ingredients, as described.

In testimony that I claim the foregoing as my own I have hereunto affixed my signature in presence of two witnesses.

HELEN C. WILBER.

Witnesses:
EMANUEL ERICKSON,
FRANK HAZEN.